United States Patent [19]
Shams et al.

[11] Patent Number: 6,145,072
[45] Date of Patent: Nov. 7, 2000

[54] INDEPENDENTLY NON-HOMOGENEOUSLY DYNAMICALLY RECONFIGURABLE TWO DIMENSIONAL INTERPROCESSOR COMMUNICATION TOPOLOGY FOR SIMD MULTI-PROCESSORS AND APPARATUS FOR IMPLEMENTING SAME

[75] Inventors: Soheil Shams, Redondo Beach; David B. Shu, Canoga Park, both of Calif.

[73] Assignee: Hughes Electronics Corporation, El Segundo, Calif.

[21] Appl. No.: 08/309,565

[22] Filed: Sep. 20, 1994

Related U.S. Application Data

[63] Continuation of application No. 08/106,465, Aug. 12, 1993, abandoned.
[51] Int. Cl.$^7$ ................................................. G06F 13/00
[52] U.S. Cl. ............................... 712/22; 712/11; 712/10; 710/2
[58] Field of Search .................................. 395/375, 800; 370/94.1; 712/22, 11, 10, 12, 13, 14; 710/2

[56] References Cited

U.S. PATENT DOCUMENTS

| | | | |
|---|---|---|---|
| 4,797,589 | 1/1989 | Collins | 370/63 |
| 5,031,139 | 7/1991 | Sinclair | 370/60 |
| 5,038,386 | 8/1991 | Li | 364/900 |
| 5,058,001 | 10/1991 | Li | 395/500 |
| 5,105,424 | 4/1992 | Flaig et al. | 370/94.1 |
| 5,146,608 | 9/1992 | Hillis | 395/800 |
| 5,151,996 | 9/1992 | Hillis | 395/800 |
| 5,175,865 | 12/1992 | Hillis | 395/800 |
| 5,257,395 | 10/1993 | Li | 395/800 |
| 5,390,336 | 2/1995 | Hillis | 395/800 |
| 5,410,727 | 4/1995 | Jaffe et al. | 395/800 |

FOREIGN PATENT DOCUMENTS 439693  8/1991  European Pat. Off. .

OTHER PUBLICATIONS

Quatember, Bernhard, "Modular Crossbar switch for large–scale multiprocessor systems–structure and implementation," AFIPS Conference Proceedings 1981, vol. 1 50, May 4, 1981–May 7, 1981 Chicago, Illinois, U.S., pp. 125–135.

Evans, Daniel B., "Fault–tolerant high–speed switched data network," Proceedings of the 7th Digital Avionics Systems Conference, Oct. 13, 1986–Oct. 16, 1986, Worthington Hotel Fort Worth, Texas, U.S., pp. 536–544.

Polymorphic–Torus Architecture for Computer Vision, Li et al 1989 IEEE publication, pp. 233–243.

VLSI Design of Dynamically reconfigurable array Processor–DRAP by, Sayfe Kiaei et al, 1989 IEEE publication, pp. 2484–2488.

*Primary Examiner*—Zarni Maung
*Attorney, Agent, or Firm*—V. D. Duraiswamy; M. W. Sales

[57] ABSTRACT

In a SIMD architecture having a two dimensional array of processing elements, where a controller broadcasts instructions to all processing elements in the array, a dynamically reconfigurable switching means useful to connect four of the processing elements in the array into a group in accordance with either the broadcast instruction of the controller or a special communication instruction held in one processing element of the group, the switch includes at least one dataline connected to each processing element in the group. A multiplexer is connected to each data line and to the controller and to a configuration register. It is adapted to load the special communication instruction from the one processing element in the group into a configuration register and to operate in accord with either the broadcast instruction from the controller or the contents of the configuration register to select one of the four data lines as a source of data and applying the data therefrom to a source output port. A demultiplexer is connected to each data line and to the controller and to said configuration register, and to the source output port of the multiplexer means, and adapted to operate in accord with either the broadcast instruction from the controller or the contents of the configuration register to select one of the four data lines as a source of data and applying the data therefrom to a selected data line. The switch also acts to connect processing elements that cross chip partitions forming the processor array. Up to four such switches can be used to connect a group of four processing elements.

13 Claims, 10 Drawing Sheets

INDEPENDENTLY NON-HOMOGENEOUSLY DYNAMICALLY RECONFIGURABLE TWO DIMENSIONAL INTERPROCESSOR COMMUNICATION TOPOLOGY FOR SIMD MULTI-PROCESSORS AND APPARATUS FOR IMPLEMENTING SAME

This is a continuation application Ser. No 08/106,465, filed Aug. 12, 1993 now abandoned.

BACKGROUND OF THE INVENTION

1. Field of the Invention

This invention relates in general to computer architectures, and, more particularly, to a dynamically reconfigurable switching means useful in connecting processing elements in processor arrays in SIMD multi-processor architectures.

2. Description of the Related Art

In processing arrays of processing elements found in SIMD multi-processor architectures, interprocessor communications connecting the eight nearest neighboring processing elements through four links per each processing element (PE) have been implemented in the X-net switch used in a commercially available machine (MasPar's MP-1), and in a university developed machine (BLITZEN at the University of North Carolina). However, none of these designs exhibit an ability for the dynamic reconfigurability of their switching units as is found in the present invention.

In the literature, reconfigurable nearest neighbor communications in processing arrays have been described at a very high level in S. J. Tomboulian, *A System for Routing Arbitrary Communication Graphs on SIMD Architectures*, Ph.D. Dissertation, Duke University, 1986. However, this description is given in a general and abstract fashion with no implementation details.

SUMMARY OF THE INVENTION

This invention describes a dynamically reconfigurable interprocessor communication network for dynamically controlling data flow between processing elements in processor arrays found in parallel Single Instruction stream Multiple Data stream (SIMD) computer architectures. Central to this invention is the design of a Dynamically Reconfigurable Switch (DRS) used to transfer data between neighboring Processing Elements (PE) in a processing array. A number of important and novel architectural features are attained through the use of the present invention. These include: requiring a minimal number of interprocessor connections per PE and allowing for local communication autonomy at the level of each PE. The former is important from a physical implementation point of view, and the later is significant for adding a new dimension of flexibility to existing SIMD architectures.

Dynamic reconfigurability of the processing elements in the processing array is achieved by associating with each PE a distinct DRS embodying the present invention. The configuration of the DRS, i.e., switch settings required to pass data from an input port to an output port, can be either set by the instructions received by all PEs (broadcast instructions) from the controller, or be independently set to a value stored locally in each PE's memory area. Special consideration has been made with respect to cascading issues arising when data is communicated with PEs forming the processing array located in different physical chips forming partitions of the processor array.

At least two primary features of this invention set it apart from other more conventional interprocessor communication schemes.

First, the design of the present invention is very efficient in using interprocessor communication links by exploiting certain communication constraints. In this design, only four bidirectional connections are required per PE to implement direct eight nearest neighbor communications. Furthermore, only a single bidirectional wire per data path bit is required to communicate between corresponding switches in neighboring chips or across partition boundaries. Consequently, the number of pins required for interprocessor communication across chip boundaries is reduced, allowing for more PEs to be implemented on a given chip.

The second significant feature of this design is the added communication flexibility achieved from dynamic reconfigurability of the DRS during processing. Typically, in SIMD parallel processing architectures, data movement between PEs is accomplished in a homogeneous fashion, see FIGS. 5A and 5B. A pre-selected direction, e.g., North, East, South, West, etc., is supplied with each communication instruction. Through use of the DRS design of the present invention, each PE can independently set a specific direction for transfer of data to, or from, its neighboring PEs. This ability to dynamically reconfigure and direct data flow during processing allows for construction of complex computational paths which better match a specific algorithm. See FIGS. 6A and 6B. For example, a number of mapping methods have been developed to efficiently take advantage of this dynamic reconfigurability of data flow through a processing array for efficiently processing neural network algorithms. Similar dynamic mapping methods can potentially be generalized to address problems in other fields.

In general, therefore, the present invention is found to be embodied in a SIMD architecture having a two dimensional array of processing elements, where a controller broadcasts instructions to all processing elements in the array, a dynamically reconfigurable switching means useful to connect four of the processing elements in the array into a group in accordance with either the broadcast instruction of the controller or a special communication instruction held in one processing element of the group, and would include at least one dataline being at least one bit wide, connected to each processing element in the group. A multiplexer unit is connected to each data line, the controller and to a configuration register. It is adapted to load the special communication instruction from the one processing element in the group into a configuration register and to operate in accord with either the broadcast instruction from the controller or the contents of the configuration register to select one of the four data lines as a source of data and applying the data therefrom to a source output port. Similarly, a demultiplexer unit is connected to each data line, the controller and to the configuration register, as well as to the source output port of the multiplexer unit. The demultiplexer is adapted to operate in accord with either the broadcast instruction from the controller or the contents of the configuration register to select one of the four data lines and applying the data from the source output port of the multiplexer unit thereto.

The present invention is also embodied in a SIMD architecture having a two dimensional array of processing elements, with multiple chips containing the processing elements of the array, where a controller broadcasts instructions to all processing elements in the array, a dynamically reconfigurable switching means useful to connect four of the processing elements in the array into a group which may cross chip boundaries to form partitions with each partition associated with one chip, to direct data movement dynamically between selected processing elements of the group in accordance with either the broadcast instruction of the controller or a special communication instruction held in one processing element of the group. In this partitioned situation, the switch would include, in each partition, at least one dataline connected to each processing element in the group in the partition. A multiplexer unit is connected to each data line, the controller and to a configuration register. It is adapted to load the special communication instruction from the one processing element in the group into a configuration register and to operate in accord with either the broadcast instruction from the controller or the contents of the configuration register to select one of the four data lines as a source of data and applying the data therefrom to a source output port. A demultiplexer unit is connected to each data line, the controller, the configuration register, and to the source output port of the multiplexer unit. The demultiplexer is adapted to operate in accord with either the broadcast instruction from the controller or the contents of the configuration register to select one of the four data lines and applying the data from the source output port of the multiplexer thereto. A dataline connects each multiplexer in one partition to the demultiplexer in the same partition, and a crossing dataline connects each multiplexer in one partition to the demultiplexer in each other partition.

The demultiplexer unit can also be adapted to operate in accord with either the broadcast instruction from the controller or the contents of the configuration register to apply the data from the source output port of the multiplexer means to at least two of the data lines.

In the partitioned situation, the dataline connecting each multiplexer unit in one partition to the demultiplexer unit in the same partition and the crossing dataline connecting each multiplexer in one partition to the demultiplexer in each other partition may be a single dataline.

Likewise, in both the partitioned and non-partitioned situations described above, the present invention is also embodied in a dynamically reconfigurable switching means that further includes between one and four of such switches in a configuration as shown in FIG. 2A. The processing element has at least one input and one output register associated with its input/output data lines. Thus, in a given configuration using for example two switches per group, two simultaneous data transfers can be implemented from any pair of processing elements in the group, to any other pair of processing elements in the same group. For this embodiment, each switch in the group has its own dedicated configuration register which can be loaded by any of the processing elements in its group.

The description of the invention presented is intended as a general guideline for the design of the invention into a specific implementation. Therefore, implementation specific details of the design are left to be determined based on the implementation technology and the allotted cost of the final product. In particular, the novel features of construction and operation of the invention will be more clearly apparent during the course of the following description, reference being had to the accompanying drawings wherein has been illustrated a preferred form of the device of the invention and wherein like characters of reference designate like parts throughout the drawings.

DETAILED DESCRIPTION OF THE PREFERRED EMBODIMENT

Figure 1:
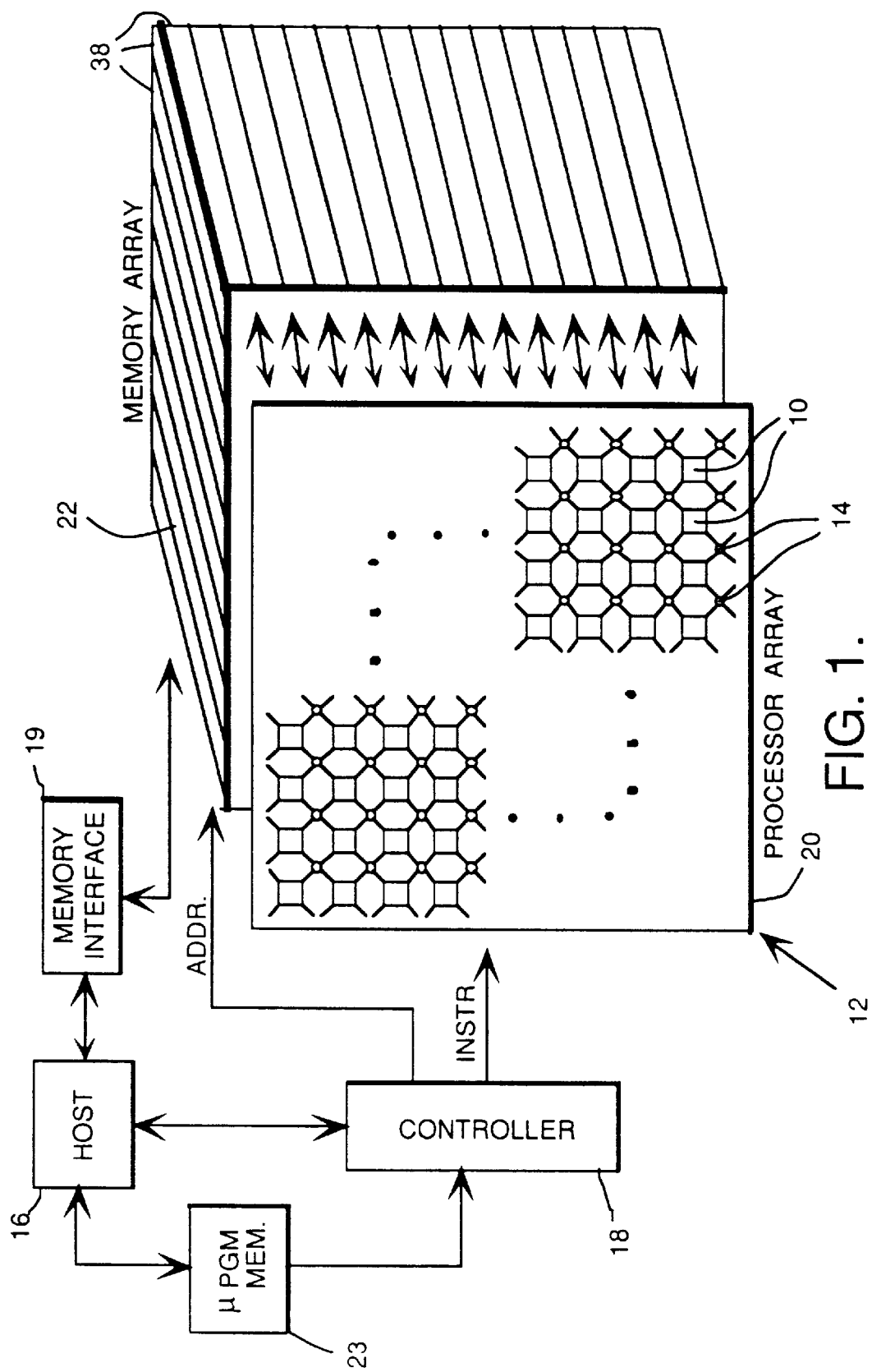
FIG. 1 is an idealized block schematic diagram illustrating the top level design of a computer architecture embodying the present invention.

With reference being made to the Figures, a preferred embodiment of the present invention is found in a computer architecture that can roughly be classified as a Single Instruction stream Multiple Data streams (SIMD) medium or fine grain parallel computer. The top level architecture of such an embodiment is depicted in FIG. 1 where each Processing Element 10 is arranged on a two dimensional lattice 12 and is connected to eight of its closest neighbors through four programmable switches 14.

The architecture is most easily discussed in three major units: the host computer 16, the controller 18, and the Processor Array 20. Its memory can be accessed by the host computer 16 through the use of high speed Direct Memory Access (DMA) channel. The host computer 16 needs only to specify the memory location of the data block to be accessed in the memory space and the number of words to be transferred.

The DMA controller 19 can transfer the data without using any additional cycles from the host computer 16. This feature permits simple programming interface between the host 16 and the coprocessor. The host computer 16 is primarily used for properly formatting the input data, long term storage of data, and as a visual interface between the user and the invention.

The controller unit 18 interfaces to both the host computer 16 and to the Processor Array 20. The controller 18 contains a microprogram memory area 23 that can be accessed by the host 16. High level programs can be written and compiled on the host 16 and the generated control information can be down loaded from the host 16 to the microprogram memory 23 of the controller 18. The controller 18 broadcasts an instruction and a memory address to the Processor Array 20 during each processing cycle. The processors 10 in the Processor Array 20 perform operations received from the controller 18 based on a mask flag available in each Processing Element 10.

The Processor Array unit 20 contains all the processing elements 10 and the supporting interconnection switches 14. Each Processing Element 10 in the Processor Array 20 has direct access to its local column of memory within the architecture's memory space 22. Due to this distributed memory organization, memory conflicts are eliminated which consequently simplifies both the hardware and the software designs.

In this architecture, the Processing Element 10 makes up the computational engine of the system. As mentioned above, the Processing Elements 10 are part of the Processor Array 20 subsystem and all receive the same instruction stream, but perform the required operations on their own local data stream. Each Processing Element 10 is comprised of a number of Functional Units 24, a small register file 26, interprocessor communication ports 28, and a mask flag 30 as illustrated in FIG. 4.

The functional units 24 in each Processing Element 10 include an adder, multiplier, shift/logic unit. Depending on the specific implementation, additional functional units 24 can be added to the design. Similar to many RISC type processors, each Processing Element 10 has an internal data bus 32 to transfer data between various units. For example, data could move from a register in the register file 26 to one of the operand registers of the adder unit, or data can be transferred from the output register of the multiplier to the I/O output port 28. A mask bit is used to enable/disable the functional units 24 from performing the operation instructed by the controller 18.

Each Processing Element 10 communicates with its neighbors through the I/O ports 28. Only one input and one output port 28 is required in each Processing Element 10 since during each systolic cycle only a single data value is received and transmitted by a Processing Element 10. In configurations utilizing more than one switch, such as the one shown in FIG. 2A, multiple Input/Output ports can be used for simultaneous data transfer between members of a group. The output of each of the I/O registers is connected to the four switches 14 surrounding each Processing Element 10. The selection of the destination Processing Element 10 for an outgoing data value and the source Processing Element 10 for an incoming data value is made by the specific switch settings of the switches 14.

Figure 4:
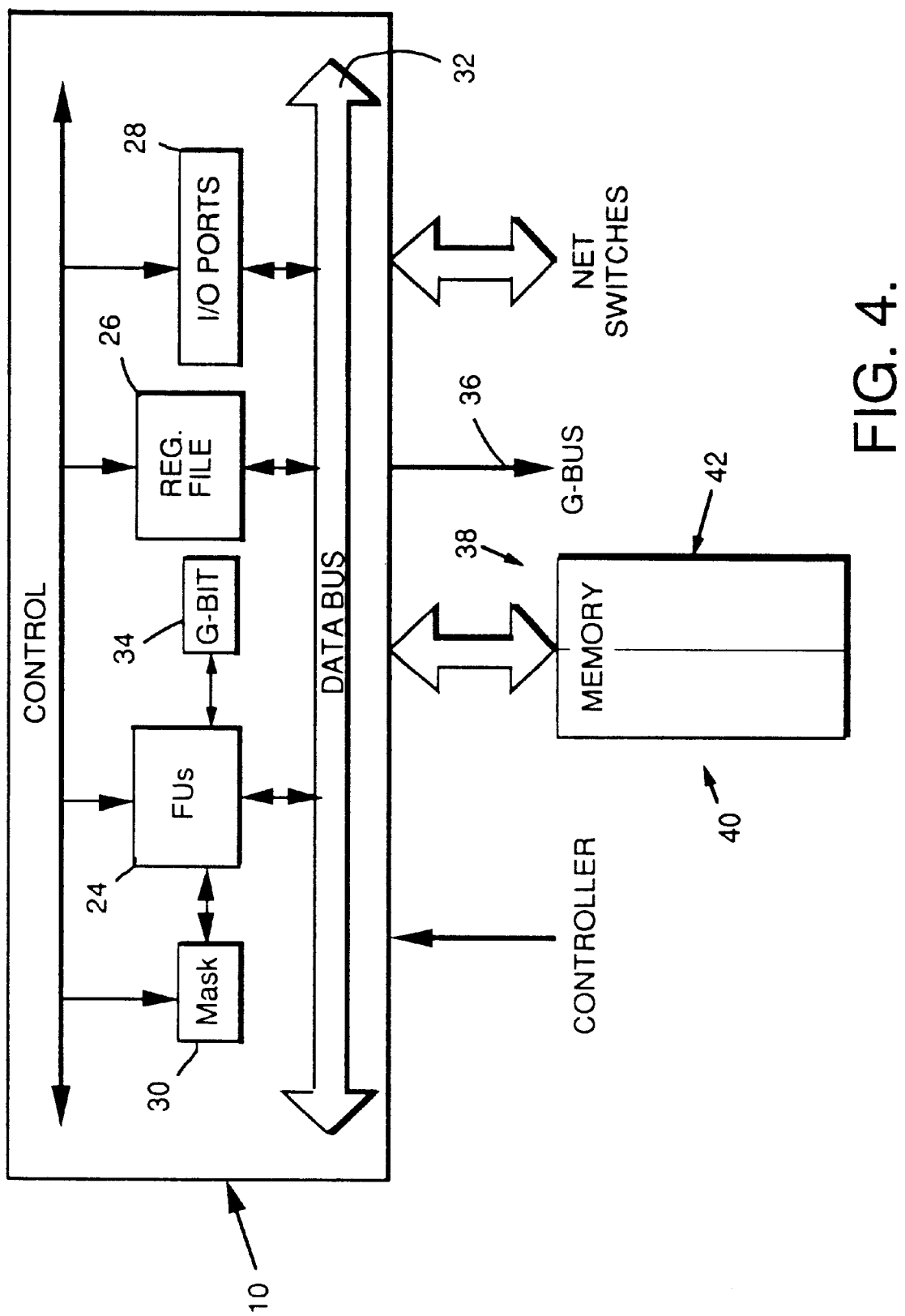
FIG. 4 is an idealized block schematic diagram illustrating the top level design of a processing element.

Each processor 10 in the architecture has read/write access to its own local memory area 38 as shown in FIG. 4. The memory can be kept off chip in order to allow for simple memory expansion. During each processing cycle, the memory location associated with each instruction is broadcasted by the controller 18 unit to all the Processing Elements 10. In this fashion, all the processors 10 can access a single plane of memory at each time step. The memory access speed is matched with the computation rate of each processor 10 so that each memory access can be completely overlapped with computation. This feature allows for efficient systolic processing.

Each word in the Processing Element's local memory area 38 is preferably comprised of two distinct fields 40, 42. The first 40 is the data field used to store and retrieve the actual data associated with the computation, such as neuron activation values, synaptic weight values, etc. The second field 42 holds three bits which indicate the switch setting for the switch 14 associated with each Processing Element 10. The three configuration bits can be decoded to select one of the eight configurations shown in FIG. 7. These switch setting values are determined prior to the start of computation and are preloaded by the host 16. A new switch setting value can be read during each instruction cycle.

Nearest neighbor communications in the Processor Array 20 are performed through dynamically reconfigurable switches 14 connecting one Processing Element 10 to three of its eight nearest neighbors. There are four switches 14 connected to each Processing Element 10, see FIG. 2.

Figure 2:
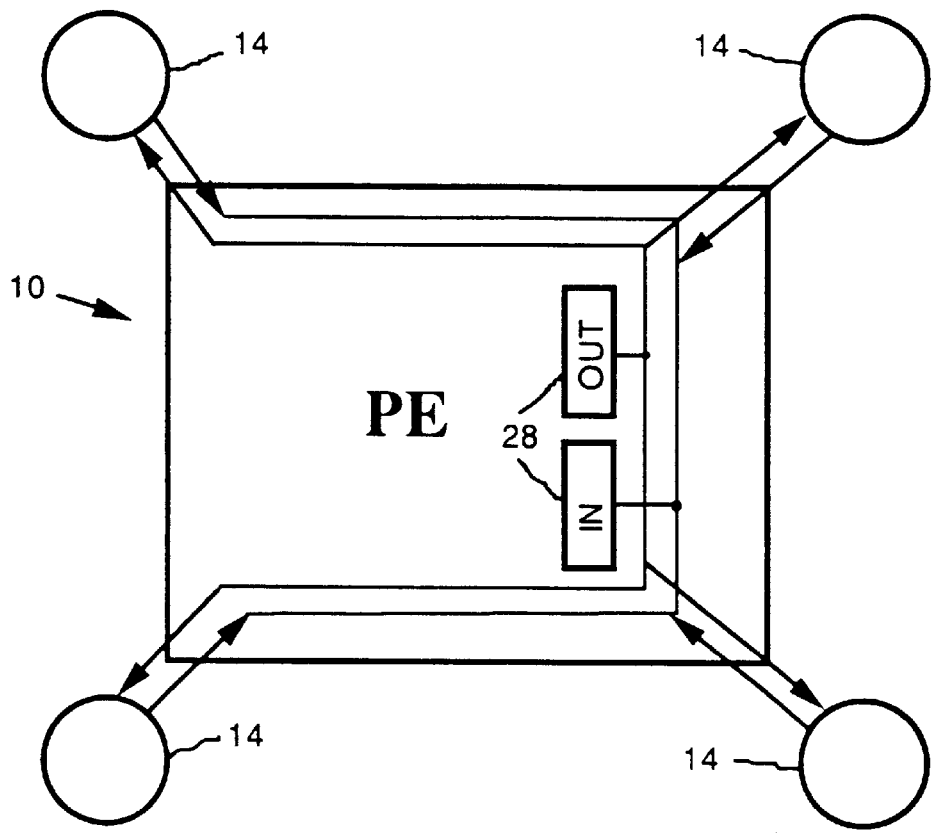
FIG. 2 is an idealized block schematic diagram illustrating a single processor and its associated DRS interprocessor communication switches.
Figure 2A:
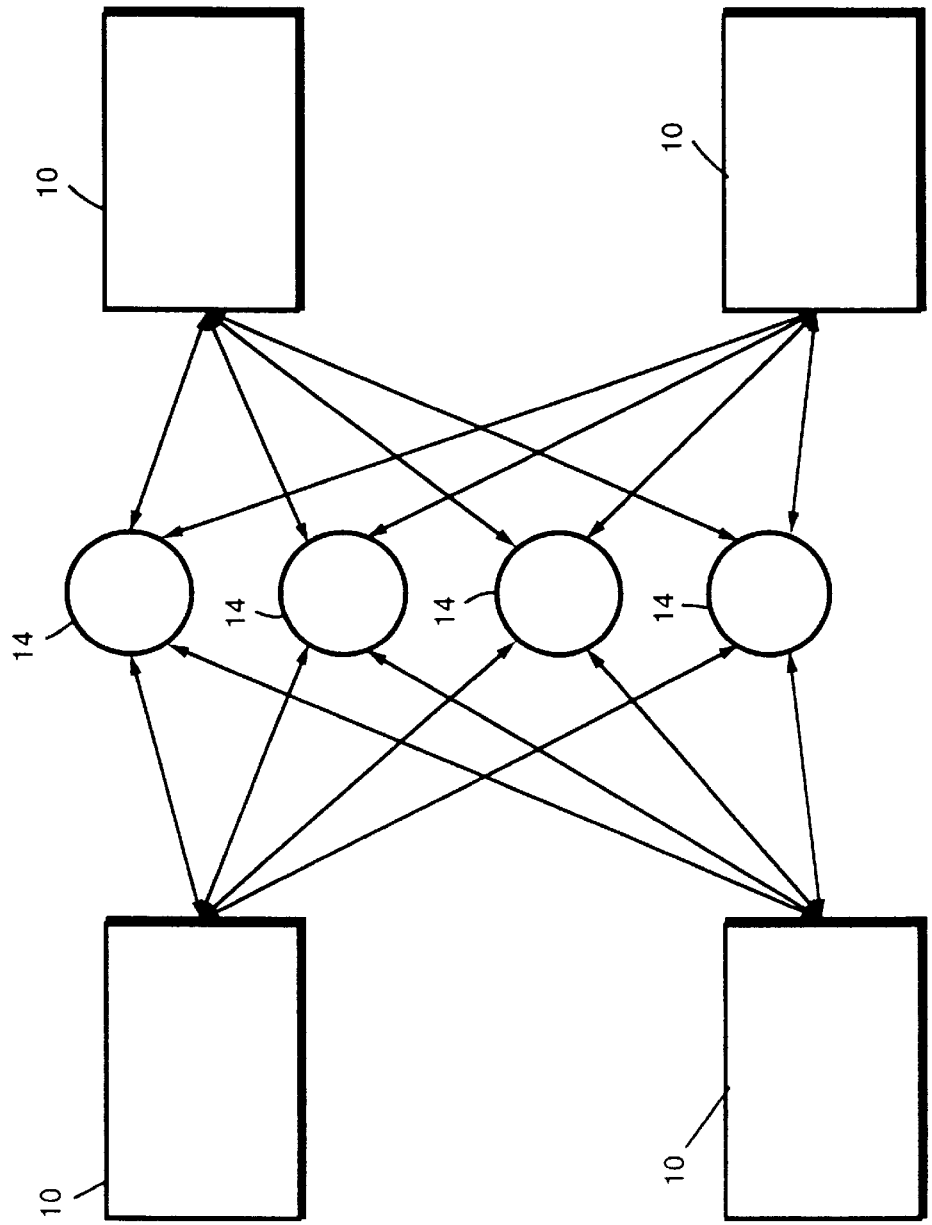
FIG. 2A is an idealized block schematic diagram illustrating a connection scheme for four processors and associated four DRS interprocessor communication switches in an alternate configuration than that of FIG. 2.

An alternate configuration for nearest neighbor communications in the Processor Array 20 is shown in FIG. 2A where up to four dynamically reconfigurable switches 14 are used in each group of four processing elements. In this configuration, in both the partitioned and non-partitioned situations described above, each processing element 10 has at least one input and one output register associated with its input/output data lines. Thus, in a given configuration using for example two switches per group, two simultaneous data transfers can be implemented from any pair of processing elements in the group, to any other pair of processing elements in the same group. For this embodiment, each switch in the group has its own dedicated configuration register which can be loaded by any of the processing elements in its group.

Referring once again to the configuration in FIG. 2, dynamically reconfigurable switch 14 allows for communication between four nearest-neighbor Processing Elements 10 while only requiring at least one I/O connection 54 to each Processing Element 10. The communication bandwidth between adjacent Processing Elements 10 are kept equal to the memory access bandwidth to assure efficient systolic processing. One unique feature of the present architecture is to allow each switch 14 in the interconnection network to be distinctly configured.

Figure 3:
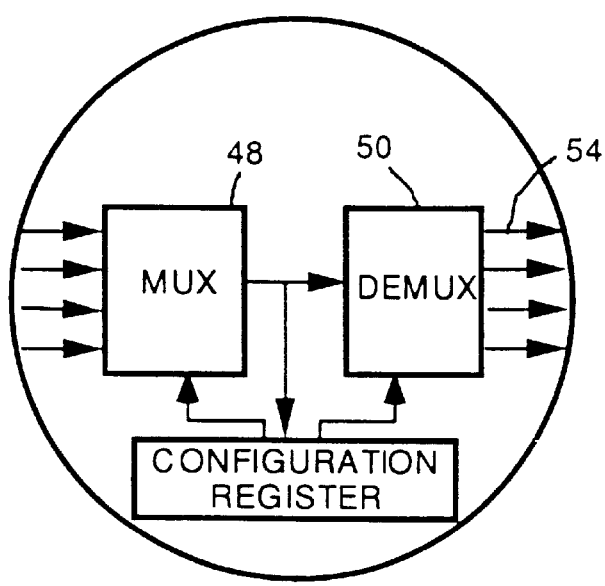
FIG. 3 is an idealized block schematic diagram illustrating a reconfigurable interprocessor communication switch.

The switch settings are stored in the local memory 38 of each switch 14 and can be accessed at the beginning of each processing cycle. The switch memory address is supplied by the controller 18 at each cycle. This design allows for a dynamically changing flow pattern of data through the processing array 20. In other two-dimensional connected parallel SIMD architectures, all the Processing Elements 10 perform the same communication operation. In other words, the instruction word broadcasted by the controller 18 specifies which direction the data is to be moved in the processing array 20, e.g., North to South, East to West, West to South, etc. In the presently described architecture, on the other hand, one Processing Element 10 can receive data from its North Neighbor while another is receiving data from its West Neighbor, depending on the local switch settings. An example implementation of this switch 14 is shown in FIG. 3 using a multiplexer 48 and demultiplexer 50 to select one of four inputs and route the data to one of four outputs 54. This flexibility in interprocessor communication is essential in efficiently implementing neural networks with sparse or block structured interconnections.

A discussion of the operation of this invention in an architectural implementation of nearest neighbor communications in an array grid of Processing Elements (PEs) is now given.

The interprocessor communications between processing elements in the processing array are performed through Dynamically Reconfigurable Switches (DRS) connecting one Processing Element to three of its eight nearest neighbors. There are four Processing Elements connected to each DRS cell.

Figure 5A:
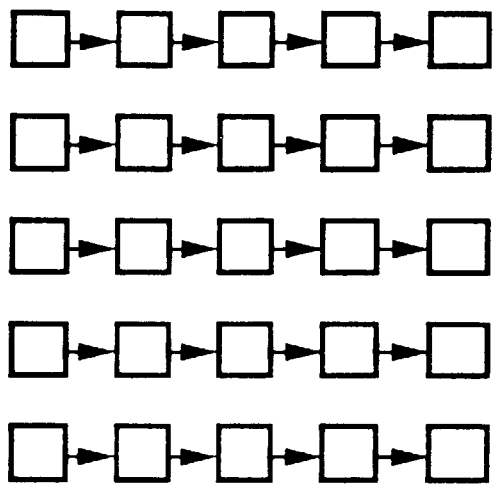
FIG. 5A is an idealized block schematic diagram illustrating homogeneous data movement between processing elements using the bypass mode of a processing array incorporating the present invention in a shift East.
Figure 5B:
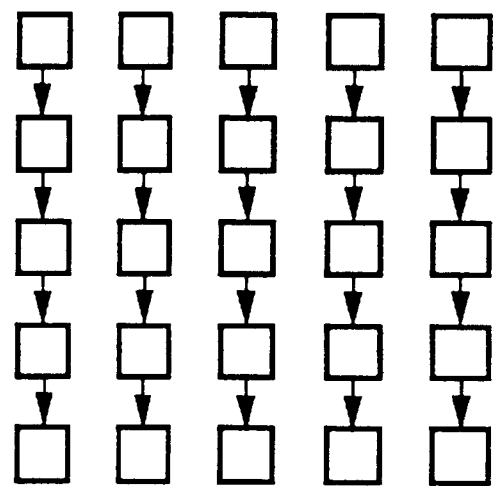
FIG. 5B is an idealized block schematic diagram illustrating homogeneous data movement between processing elements using the bypass mode of a processing array incorporating the present invention in a shift South.

A configuration register within the DRS controls the selection of source and destination ports for the data flowing through the switch. The content of this configuration register can be set by only one of the processing elements connected to the switch, e.g., the upper left Processing Element of the DRS. Due to the extra overhead associated with loading new configuration values into the configuration register, a by-pass mode may be implemented so that the data movement direction is supplied by the specific communication instruction. When using the bypass mode, data movement in the processor array is homogeneous, like that of conventional SIMD parallel processors. In this mode the instruction specifies the direction of data movement for all the Processing Elements in the system. See FIGS. 5A and 5B.

Figure 6A:
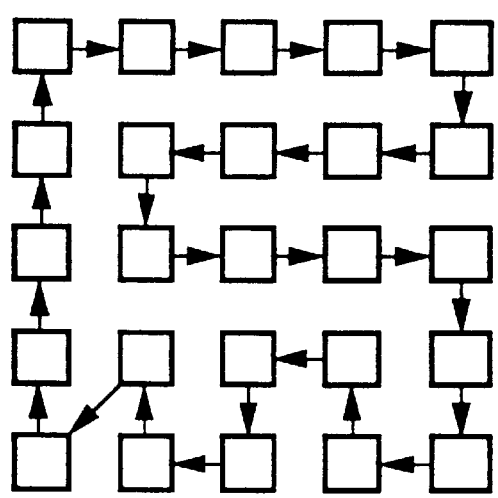
FIG. 6A is an idealized block schematic diagram illustrating inhomogeneous data movement between processing elements using different values in the Conf_Reg of the present invention to implement a one dimensional ring structure on the processor array.
Figure 6B:
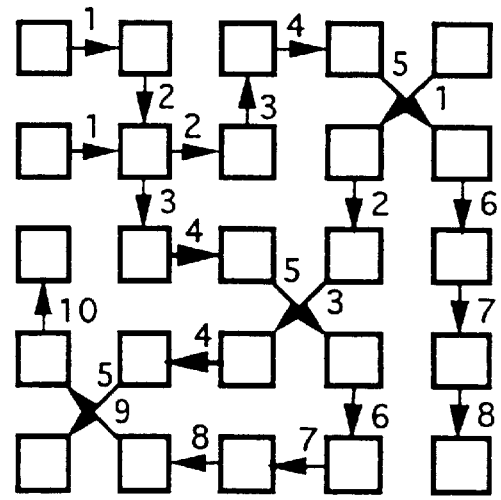
FIG. 6B is an idealized block schematic diagram illustrating inhomogeneous data movement between processing elements using different values in the Conf_Reg of the present invention to implement arbitrary complex flow patterns on the processor array with the numbers above the linking arrows indicating the communication cycle corresponding to the specific data movement.

On the other hand, by using the configuration register, inhomogeneous communication patterns can be formed on the processing array. A unique feature of this invention is to allow each switch in the interconnection network to be distinctly configured. The configuration register can be configured once at the start of processing to implement a specific communication pattern, such as constructing a one dimensional computational ring on the array as shown in FIG. 6A without ever changing during the computation. On the other hand, it can be dynamically reconfigured to form complex flow patterns on the processing array for each communication step as shown in FIG. 6B.

Figure 7:
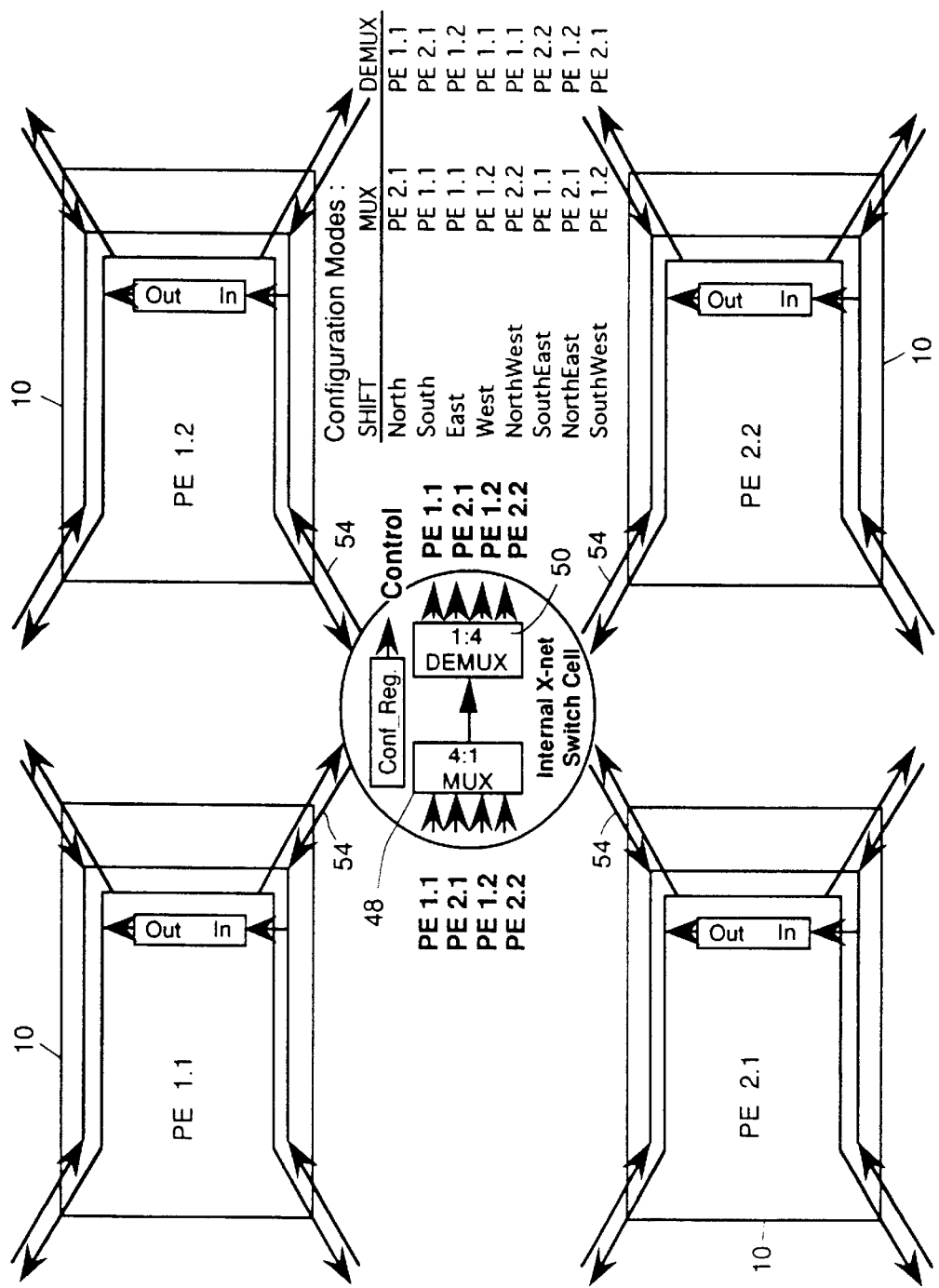
FIG. 7 is an idealized block schematic diagram illustrating a single dynamically reconfigurable switch embodying the present invention and its associated processing elements in the processor array.

The 3-bit Conf_Reg specifies one of eight directions the data is to be moved, e.g., South to North, East to West, West to South (see FIG. 7). For a given configuration mode, a multiplexer and demultiplexer are used to select one of four inputs and route the data to one of four outputs as listed in FIG. 7. Associated with each Conf_Reg there are additional decoding hardware used to generate the appropriate control signals. For the sake of clarity, these details have been omitted in all the drawings. Each PE is identified in all drawings by its row and column coordinate (r.c.). For example, PE 1.1 represents PE located at row one and column one in the Processor Array (PA). The DRS bus width is not explicitly defined and can vary from 1 to m bits.

Figure 8:
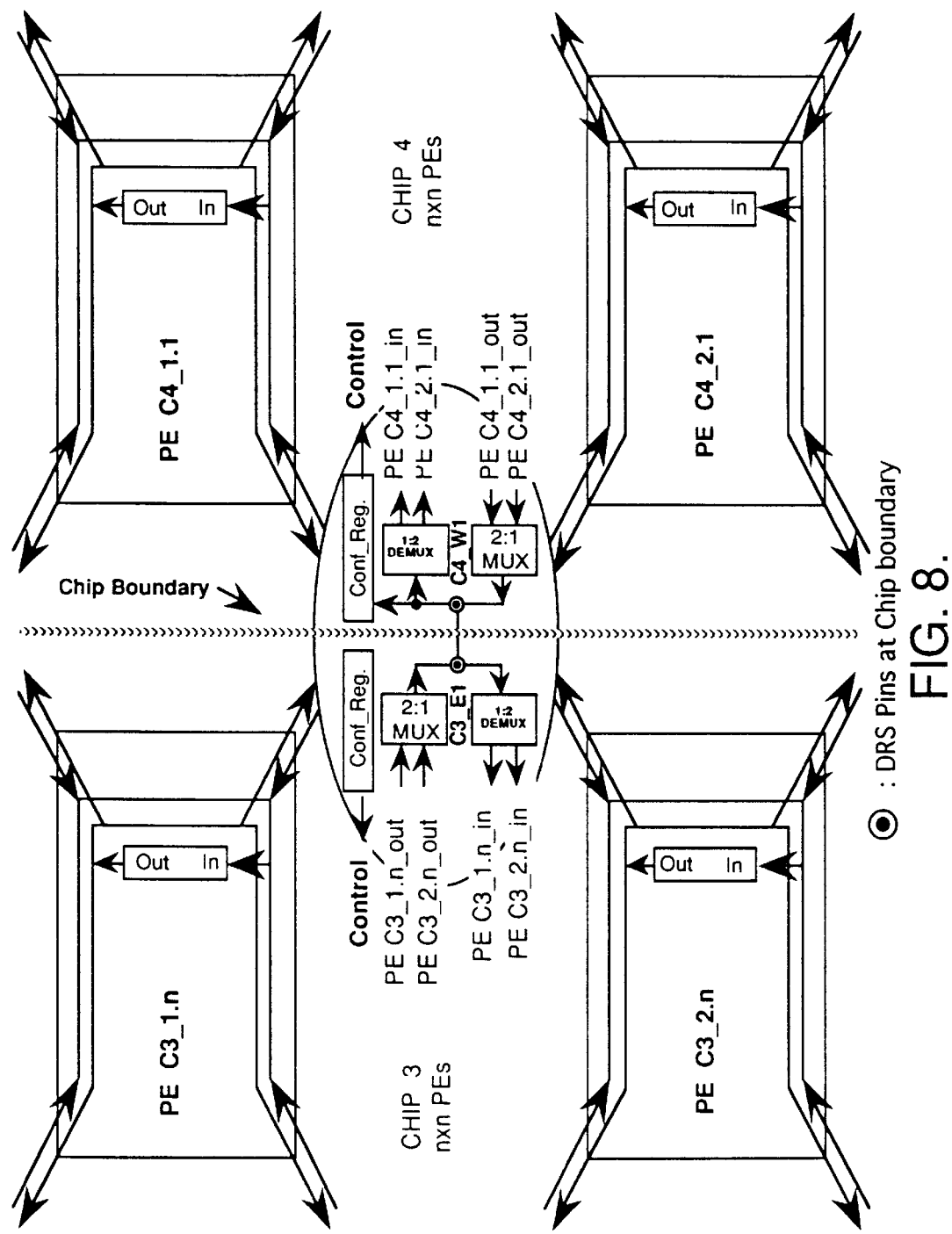
FIG. 8 is an idealized block schematic diagram illustrating a single dynamically reconfigurable switch embodying the present invention and its associated processing elements in the processor array with East-West interprocessor communications between neighboring processing elements across chip boundaries.

If the required Processor Array is larger than a single chip (e.g., each chip contains n×n PEs, then the DRS cells of the PEs located at the chip boundaries need to be partitioned among multiple chips. An example partition of this switch is shown in FIG. 8. A single bidirectional wire per bus bit is used to connect neighboring PEs in the west side to corresponding neighbors in the east side. In addition to r.c. coordinates within a chip, each PE is identified by its chip number. For example, PE C3_1.n represents PE located on row 1 and column n in chip 3. Similarly, PE C3_1.n_out and PE C3_1.n_in represent output channel and input channel respectively, of this PE. Since the switch shown is controlled by PE C3_1.n on the west side, the configuration information needs to be transmitted across the chip boundary to the East half of the switch before the data communication channel can be established. Therefore, two Conf_Reg are required, one for the West half and one for the East half. The extra copy of the Conf_Reg on the East half is needed to prevent both West-side Mux and East-side mux from driving the same bus simultaneously.

Figure 9:
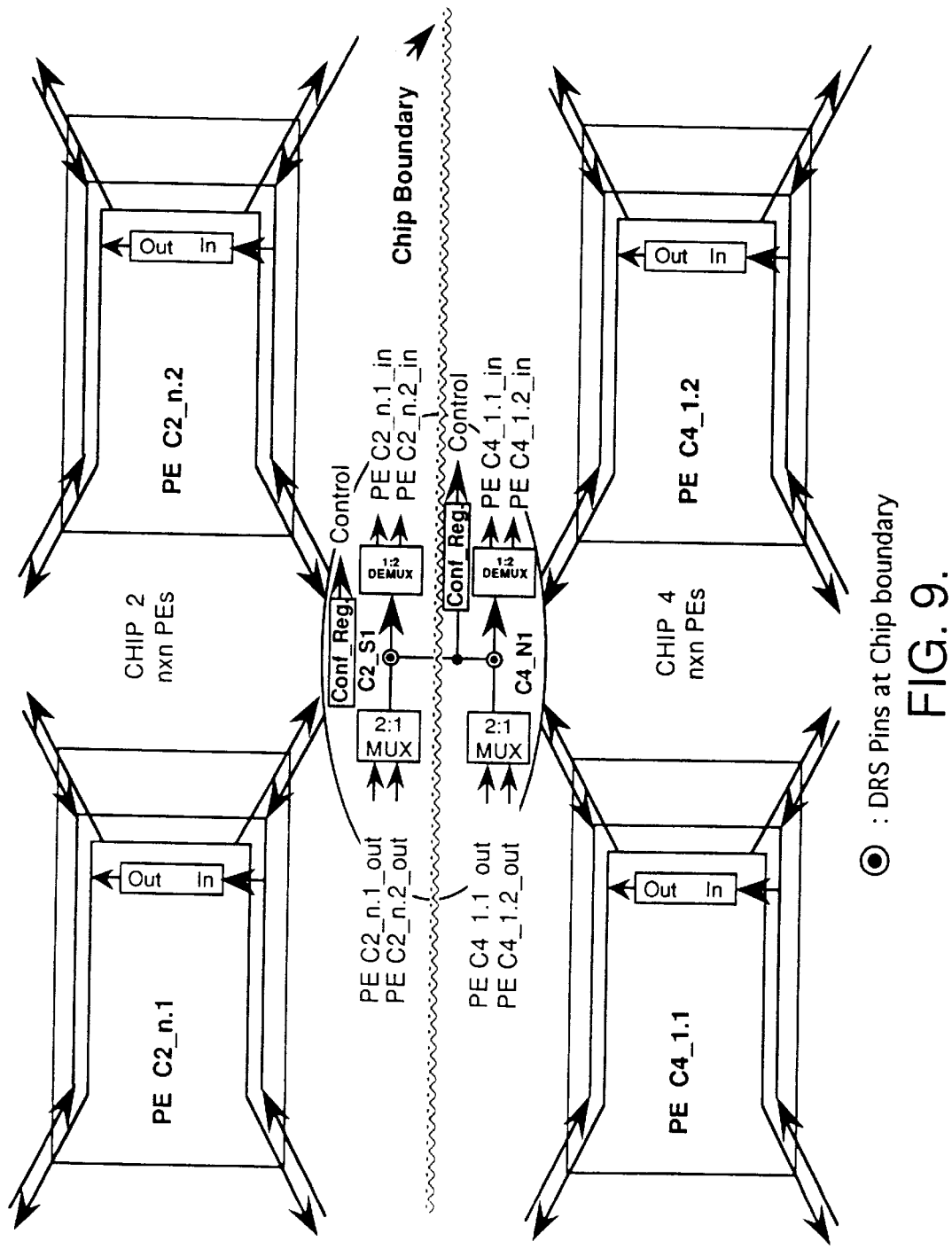
FIG. 9 is an idealized block schematic diagram illustrating a single dynamically reconfigurable switch embodying the present invention and its associated processing elements in the processor array with North-South and East-West interprocessor communications between neighboring processing elements across chip boundaries.

There is one wire per data bus width connecting the West side of chip 3 pin #1 (i.e., C3_E1) to the East side of chip 4 pin #1 (i.e., C4_W1). The data channel and configuration channel share this same bus wire connecting two neighboring chips; the instruction to load the Conf_Reg will pre-configure the west-half of the switch cell to select PE C3_1.n—out so that the extra copy of Conf_Reg on the east half of the switch can be initialized. For a bus width of 1 bit, this instruction takes four cycles to execute, i.e., one cycle to read the configuration mode from the memory of PE C3_1.n into the Conf_Reg of the west-half of the DRS and 3 cycles to load this information into Conf_Reg of the East-half of the DRS. This could be a large overhead for those operations which do not require each switch in the interconnection network to be distinctly configured. Therefore, the switch cell will be allowed to bypass the Conf_Reg and take the configuration mode information directly from the instruction field, as explained earlier. FIG. 9 shows North-South partition of the DRS. There is one wire connecting the South side of chip 2 pin #1 (i.e., C2_S1) to the North side of chip 4 pin #1 (i.e., C4_N1). The procedure for loading the configuration value into the North-south halves of the DRS is similar to the one described for the West-East direction.

Figure 10:
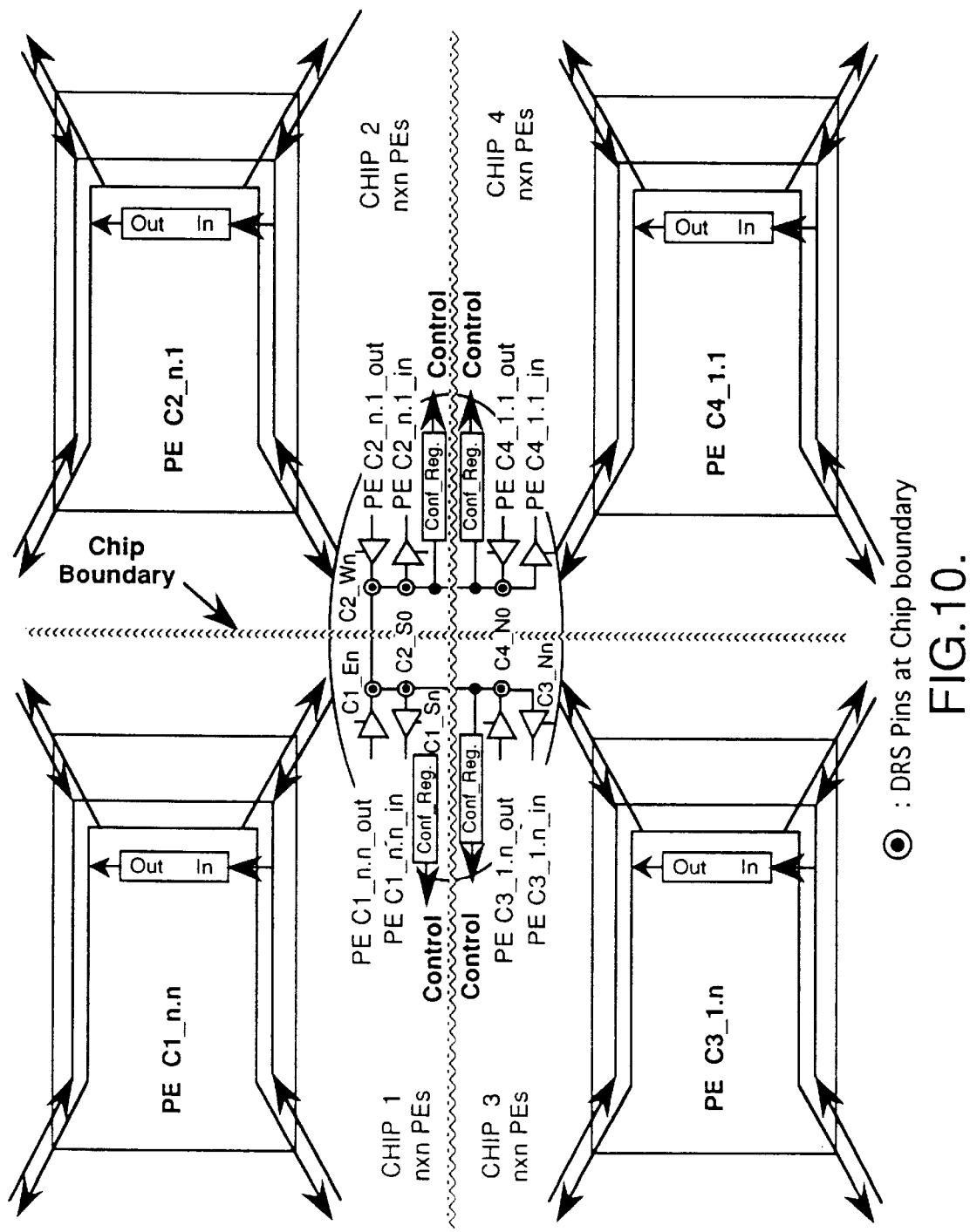
FIG. 10 is an idealized block schematic diagram illustrating a single dynamically reconfigurable switch embodying the present invention and its associated processing elements in the processor array with North-South and East-West interprocessor communications between neighboring processing elements across chip corners; and, FIG. 11 is an idealized block schematic diagram illustrating the interconnection of four chips containing processing elements in the processing array utilizing dynamically reconfigurable switches embodying the present invention and interprocessor communications between neighboring processing elements across chip boundaries.
Figure 11:
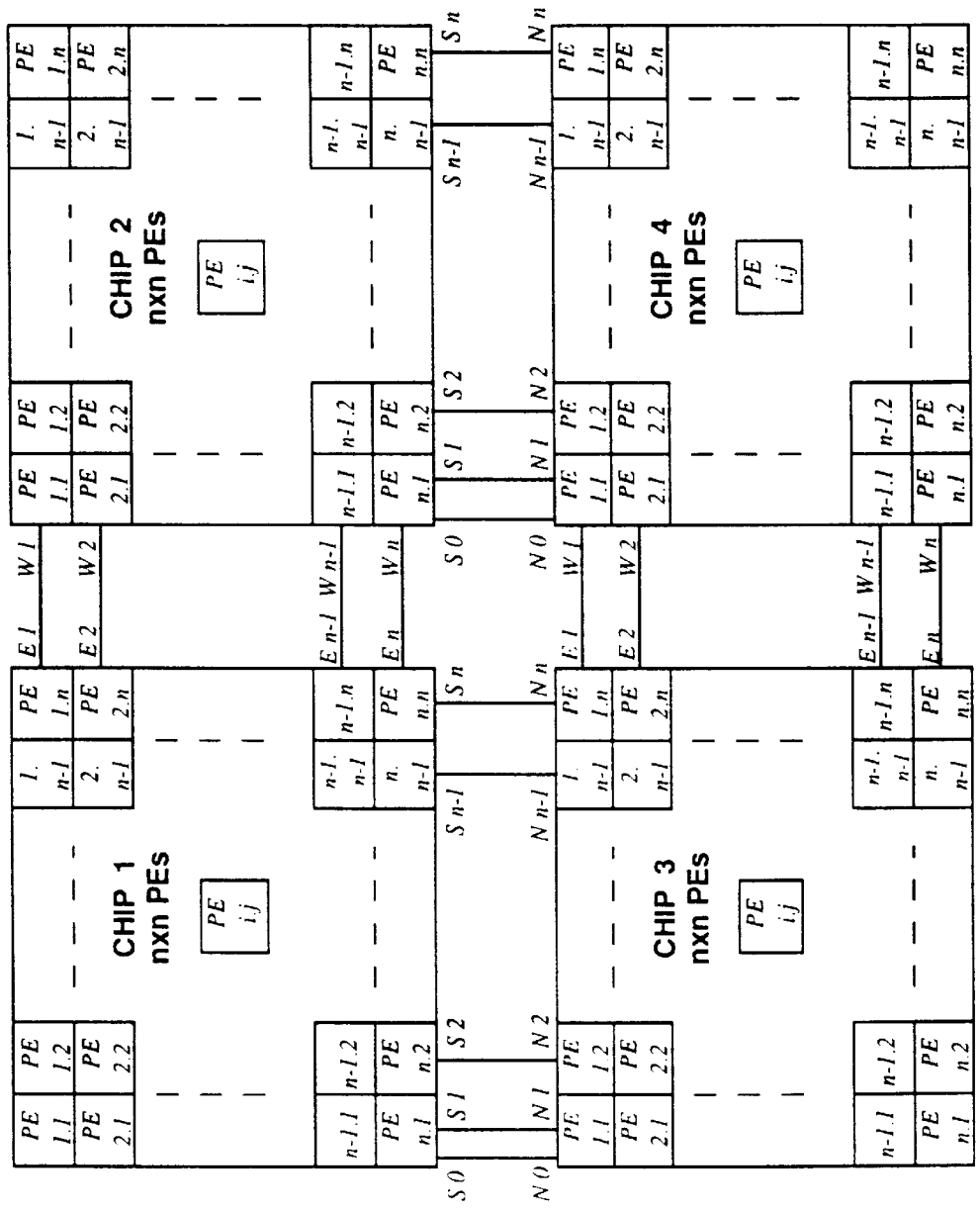

FIG. 10 shows corner partition of the DRS, which spreads over four adjacent corners of four chips. There is one copy of Conf_Reg on each corner of the switch. The load Conf_Reg instruction will pre-configure the upper-left corner DRS cell to select PE C1_n.n_out, so that all three extra copies of Conf_Reg on each corner of the switch can be initialized. There is one wire connecting the South side of chip 1 pin #n (i.e., C1_Sn) to the North side of chip 3 pin #n (i.e., C2_Wn). One extra wire connects the south side of chip 2 pin #0 (i.e., C2_S0) to the north side of chip 4 pin #0 (i.e., C4_N0) so that chip 1 and chip 4 can have diagonal connection between them. Therefore, there are (n+1) wires (i.e., S0_N0 to Sn_Nn) in the North-South direction vs. n wires (i.e., E1_W1 to En_Wn) in the East-West direction to support diagonal connections. This fact is dictated by the corner partition of the switch. In other words, refer to both FIG. 9 and FIG. 11, it is obvious that pins C2_S1 to C2_Sn are assigned to PE C2_n.1 to PE C2_n.n in chip 2, while pin C2_S0 in chip 2 is assigned to PE C1_n.n located at chip 1 to support its diagonal connection to chip 4, as shown in FIG. 10.

Up to four switches containing a multiplexer, demultiplexer, and a configuration register groupings can be used at each switching point in the interconnection network. When four such switches are used, an electronic crossbar communications switch is formed between the four processing elements in the group, allowing for simultaneous communications between all four processing elements in the group.

The invention described above is, of course, susceptible to many variations, modifications and changes, all of which are within the skill of the art. It should be understood that all such variations, modifications and changes are within the spirit and scope of the invention and of the appended claims. Similarly, it will be understood that Applicant intends to cover and claim all changes, modifications and variations of the example of the preferred embodiment of the invention herein disclosed for the purpose of illustration which do not constitute departures from the spirit and scope of the present invention.

What is claimed is:

1. In a SIMD architecture having a two dimensional array of processing elements, where a controller broadcasts at least one broadcast instruction to all processing elements in the array, a dynamically reconfigurable switching means useful to connect four of the processing elements in the array into a group in accordance with either the broadcast instruction of the controller or a special communication instruction held in one selected processing element of the group, the switch comprising:

at least one dataline connected to each of the processing elements in the group;

a multiplexer means connected to each data line and to the controller and to a configuration register external to any processing element of the group, said configuration register controllable by any of the processing elements in the group, for loading the special communication instruction from the one selected processing element in the group into the configuration register and to operate in accord with either the broadcast instruction from the controller or the contents of the configuration register to select one of the data lines as a source of data and applying the data therefrom to a source output port; and a demultiplexer means connected to each data line and to the controller and to said configuration register, and directly connected to a source output port of the multiplexer means, to operate in accord with either the broadcast instruction from the controller or the contents of the configuration register to select one of the data lines and applying the data received directly from the source output port of the multiplexer means thereto.

2. A dynamically reconfigurable switching means as in claim 1 further including at least one multiple bit width data line connected to a corresponding processing element, said processing element having at least one input/output register, and further including at least one configuration register for receiving and retaining therein a plurality of selected bits of said at least one multiple bit width data line.

3. A dynamically reconfigurable switching means as in claim 1 wherein there is at least one said switch including said multiplexer means, said demultiplexer means and said configuration register externally located between each group of four processing elements.

4. A dynamically reconfigurable switching means as in claim 1 wherein there is a plurality of not more than four of said switch including said multiplexer means, said demultiplexer means and said configuration register externally located between each group of four processing elements.

5. A dynamically reconfigurable switching means as in claim 1 wherein said demultiplexer means operates in response to the broadcast instruction from the controller or the contents of the configuration register to apply the data from the source output port of the multiplexer means to at least two of the data lines in the group of four data lines.

6. In a SIMD architecture having a two dimensional array of processing elements, with multiple chips containing the processing elements of the array, where a controller broadcasts instructions to all processing elements in the array, a dynamically reconfigurable switching means useful to connect four of the processing elements in the array into a group which may cross chip boundaries to form partitions with each partition associated with one chip, to direct data movement dynamically between selected processing elements of the group in accordance with either the broadcast instruction of the controller or a special communication instruction held in one processing element of the group, the switch comprising in each partition:

at least one dataline connected to each processing element in the group in the partition;

a multiplexer means connected to each data line and to the controller and to a configuration register external to any processing element of the group, said configuration register controllable by any of the processing elements in the group, for loading the special communication instruction from one processing element in the group into the configuration register and to operate in accord with either the broadcast instruction from the controller or the contents of the configuration register to select one or none of the data lines in the partition as a source of data and applying the data therefrom to a source output port;

a demultiplexer means connected to each data line and to the controller and to said configuration register, and directly connected to the source output port of the multiplexer means, and for operating in response to the broadcast instruction from the controller or the contents of the configuration register to apply directly the data from the source output port of the multiplexer means to a selected one or none of the data lines in the partition; and a dataline connecting each multiplexer in one partition to the demultiplexer in the same partition, and a crossing dataline connecting each multiplexer in one partition to the demultiplexer in each other partition.

7. A dynamically reconfigurable switching means as in claim 6 wherein said dataline connecting each multiplexer unit in one partition to the demultiplexer unit in the same partition and said crossing dataline connecting each multiplexer in one partition to the demultiplexer in each other partition is a single dataline.

8. A dynamically reconfigurable switching means as in claim 6 further including at least one multiple bit width data line connected to a corresponding processing element, said processing element having at least one input/output register and at least one configuration register for receiving and retaining therein a plurality of selected bits of said at least one multiple bit width data line.

9. A dynamically reconfigurable switching means as in claim 6 wherein said demultiplexer means operates in response to the broadcast instruction from the controller or the contents of the configuration register to apply the data from the source output port of the multiplexer means to at least two of the data lines in the partition.

10. A dynamically reconfigurable switching means as in claim 6 wherein there is at least one said switch including said multiplexer means, said demultiplexer means and said configuration register externally located between each group of four processing elements.

11. A dynamically reconfigurable switching means as in claim 6 wherein there is a plurality of not more than four of said switch including said multiplexer means, said demultiplexer means and said configuration register externally located between each group of four processing elements.

12. A dynamically reconfigurable switching means as in claim 6 wherein said multiplexer means is further adapted to load the special communication instruction from one processing element in the group into a configuration register and to operate in accord with either the broadcast instruction from the controller or the contents of the configuration register to select one or none of the data lines in the partition as a source of data and applying the data therefrom to a source output port selected in one of the partitions.

13. A dynamically reconfigurable switching means as in claim 6 wherein said demultiplexer means is further adapted to operate in accord with either the broadcast instruction from the controller or the contents of the configuration register to select a unique source output port from all the partitions and to apply the data from the selected source output port to a selected one or none of the data lines in its partition.

* * * * *